(12) United States Patent  (10) Patent No.: US 6,738,506 B2
Miller et al.                (45) Date of Patent:     May 18, 2004

(54) IMAGE PROCESSING SYSTEM FOR MULTI-BEAM INSPECTION

(75) Inventors: S. Daniel Miller, Gilroy, CA (US); N. William Parker, Fairfield, CA (US); Steven B. Hobmann, Thousand Oaks, CA (US)

(73) Assignee: Multibeam Systems, Inc., Santa Clara, CA (US)

( * ) Notice: Subject to any disclaimer, the term of this patent is extended or adjusted under 35 U.S.C. 154(b) by 0 days.

(21) Appl. No.: 10/125,054

(22) Filed: Apr. 17, 2002

(65) Prior Publication Data

US 2002/0167487 A1 Nov. 14, 2002

Related U.S. Application Data

(60) Provisional application No. 60/285,390, filed on Apr. 18, 2001.

(51) Int. Cl.[7] .................................................. G06K 9/00
(52) U.S. Cl. ................... 382/151; 382/147; 382/278; 382/305; 348/464; 348/523; 700/24
(58) Field of Search ............................ 382/151, 149, 382/291, 293, 145, 141, 318, 144, 147, 168, 181, 278, 304, 303, 305; 348/87, 127, 126, 406.1, 464, 500, 523; 700/4, 24

(56) References Cited

U.S. PATENT DOCUMENTS

| 4,541,115 A | * | 9/1985 | Werth .......................... 382/159 |
|---|---|---|---|
| 4,817,175 A | * | 3/1989 | Tenenbaum et al. ......... 382/172 |
| 5,384,463 A | | 1/1995 | Honjo et al. ................. 250/398 |
| 5,430,292 A | | 7/1995 | Honjo et al. ................. 250/310 |
| 5,557,105 A | | 9/1996 | Honjo et al. ................. 250/310 |
| 5,699,447 A | * | 12/1997 | Alumot et al. ............... 382/145 |
| 5,799,111 A | | 8/1998 | Guissin ....................... 382/254 |
| 5,825,482 A | * | 10/1998 | Nikoonahad et al. ..... 356/237.2 |
| 5,892,224 A | | 4/1999 | Nakasuji ...................... 250/310 |
| 6,031,607 A | | 2/2000 | Miyazaki .................. 356/237.1 |
| 6,252,412 B1 | | 6/2001 | Talbot et al. ................ 324/750 |
| 6,465,783 B1 | | 10/2002 | Nakasuji ...................... 250/311 |
| 6,538,248 B1 | * | 3/2003 | Kametani et al. ........... 250/310 |
| 6,539,106 B1 | * | 3/2003 | Gallarda et al. ............. 382/149 |

* cited by examiner

Primary Examiner—Bhavesh M. Mehta
Assistant Examiner—Sheela C Chawan
(74) Attorney, Agent, or Firm—David Jaffer; Pillsbury Winthrop LLP

(57) ABSTRACT

An image processing system for use in semiconductor wafer inspection comprises a multiplicity of self-contained image processors for independently performing image cross-correlation and defect detection. The system may also comprise an image normalization engine for performing image brightness and contrast normalization. The self-contained image processors and image normalization engine access image data from a memory array; the array is fed data from a multiplicity of imaging modules operating in parallel. The memory array is configured to allow simultaneous access for data input, normalization, and cross-correlation and defect detection. Multiple image processing systems can be configured in parallel as a single image processing computer, all sending defect data to a common display module.

30 Claims, 7 Drawing Sheets

IMAGE PROCESSING SYSTEM FOR MULTI-BEAM INSPECTION

CROSS-REFERENCE TO RELATED APPLICATIONS

This application claims the benefit of U.S. Provisional Application No. 60/285,390 filed Apr. 18, 2001.

BACKGROUND OF THE INVENTION

1. Field of the Invention

This invention relates to the field of image processing systems, and in particular to image processing systems for use in multi-beam inspection of semiconductor wafers and masks.

2. Description of the Related Art

Image processing computers and inspection systems have been developed for semiconductor wafer and mask inspection. These wafer and mask inspection systems generally have only one imaging probe, and consequently the image processing systems used to identify defects are designed to manipulate sequential or serial data. Inspection systems with only one probe are currently only able to inspect semiconductor wafers at a rate approaching one hundredth of the processing rate of the wafers in a state-of-the-art semiconductor fabrication facility. There is a need for semiconductor wafer inspection systems with much higher throughput. One approach to achieving higher throughput is to use many imaging probes in parallel on the wafer; this then requires an image processing computer designed to accept parallel image data input and to do defect analysis in a parallel mode.

SUMMARY OF THE INVENTION

This invention includes an image processing system with a novel, highly parallel architecture. The image processing system can be used in the inspection of semiconductor wafers and masks. Image processing systems can be combined in parallel, as required. According to aspects of the invention, the image processing system comprises: a buffer memory array for acquiring raw image data and processed image data; a multiplicity of asynchronous symmetrical image processors (ASIPs) connected to the buffer memory array, each of the ASIPs being a self-contained image processor for independently performing image cross-correlation and defect detection on image data from equivalent areas of different die on a semiconductor wafer. The image processing system may further comprise one or more of the following: an image normalization engine connected to the buffer memory array, for normalizing image contrast and brightness so as to facilitate die to die image comparison as performed by the multiplicity of ASIPs; a multiplicity of parallel data channels connected to the buffer memory array, for delivering raw image data to the buffer memory array; a defect map memory connected to the multiplicity of ASIPs, for storing a map of defects as identified by an algorithm programmed into the multiplicity of ASIPs; a histogram data link connected to the image normalization engine, for delivering raw image data; and, a cross-correlation memory connected to the multiplicity of ASIPs, for storing pattern block offset data. In preferred embodiments the buffer memory array is divided into three independently and simultaneously addressable memory blocks, such that there is simultaneous access for raw image data input, normalization, and cross-correlation and defect detection. In preferred embodiments the image normalization engine comprises histogram tabulation engines connected to the histogram data link, for real-time generation of histograms of raw image data.

For the inspection of semiconductor wafers and masks, the image processing system is part of a novel inspection system, with a highly parallel architecture. According to further aspects of the invention, the inspection system, configured for a semiconductor wafer patterned with an array of identical die, comprises: an array of modules, each module comprising a probe forming system and a detector, the array comprising a multiplicity of module rows, the array of die on the wafer being aligned with the module rows; a multiplicity of image processing systems; and, a multiplicity of parallel data channels connecting the detectors with the processing systems. In different embodiments, the modules can comprise electron, charged particle or light probe forming systems. In a preferred embodiment, there is one image processing system dedicated to each row of modules. The inspection system may further comprise an inspection image display module connected to the multiplicity of image processing systems.

Further aspects of the invention including a method for semiconductor wafer defect detection comprising the steps of: acquiring raw image data from the wafer; simultaneous to the acquiring step, normalizing image data for contrast and brightness; and simultaneous to the acquiring and normalizing steps, performing cross-correlation and defect detection on normalized image data. Preferred embodiments of the method for defect detection include implementation of the performing step by a multiplicity of ASIPs. The method for defect detection may further comprise one or more of the following: ASIPs which utilize a pattern block inspection sequence designed to minimize the time required to complete cross-correlation; and simultaneous to the performing step, taking data from a cross-correlation memory, for establishing an efficient starting point for cross-correlation.

A further method of the invention utilizes a buffer memory array divided into three independently and simultaneously addressable memory blocks (A, B and C). In this method, data acquisition, data normalization, and cross correlation & defect detection utilize the buffer memory array continuously, although the buffer memory accessed (A, B or C) changes in a cyclic mode at constant time intervals; following the processing in one buffer memory: the raw image data is acquired, this image data is then normalized, this normalized data is accessed for cross-correlation and defect detection, new raw image data is acquired, etc. continuing in a cyclic mode until all the image data for a wafer has been acquired and processed.

DETAILED DESCRIPTION

Figure 1A:
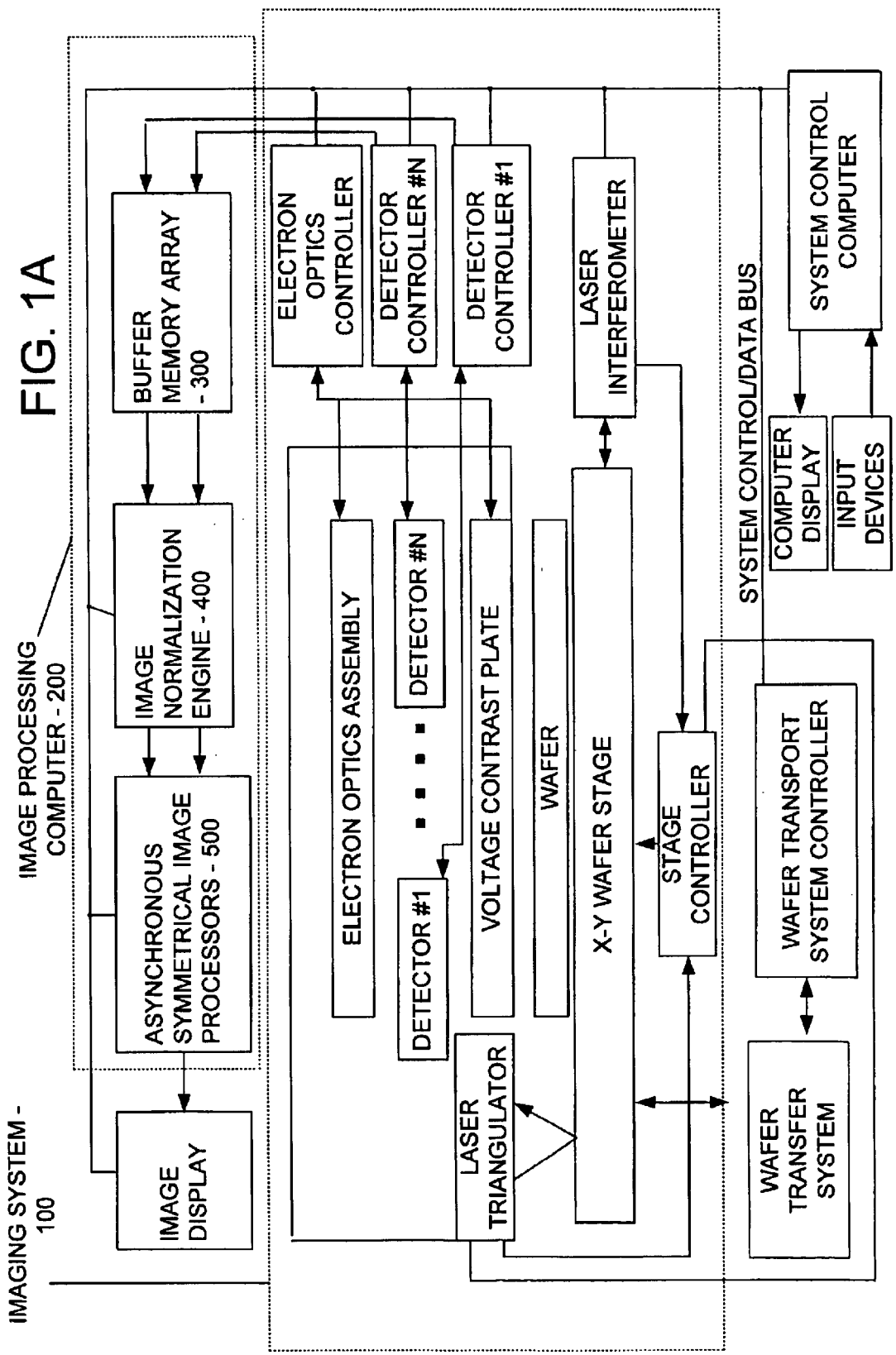
FIG. 1A is a block diagram of an inspection system.

A novel image processing system and a novel inspection system, containing such an image processing system, are described herein; these systems are designed for the inspection of semiconductor wafers, which are typically covered with a regular array of identical die. FIG. 1A is a block diagram of one embodiment of the inspection system. In FIG. 1A, imaging system 100, image processing computer 200, buffer memory array 300, image normalization engine 400, asynchronous symmetrical image processors 500, and various other components, which are described below, are shown. Imaging system 100 is used to acquire raw image data for defect analysis and includes a stage to move the wafer; a wafer loading and handling mechanism is typically integrated with the imaging system 100. The embodiment of the imaging system 100 shown in FIG. 1A has a multi-beam multi-column electron beam assembly with one secondary electron detector per column; details of such a multi-beam multi-column electron beam assembly are given in U.S. application Ser. No. 09/789,180 and PCT Application No. PCT/US01/05338, incorporated by reference herein. Many other imaging assemblies, not shown here, may be suitable for incorporation in the imaging system, including: multi-column electron beam or charged particle beam assemblies with multiple detectors; light optical assemblies with multiple sets of imaging optics and multiple detectors; single electron beam, single charged particle beam, or single light optical probe assemblies with multiple detectors; single electron beam, single particle beam, or single light optical probe assemblies with a single high bandwidth detector, the output from which can be distributed to multiple channels. The image processing computer 200 acquires and analyzes the raw image data, generating a defect map for the wafer; this defect map and related information is displayed on an image display. A system control computer coordinates all of the components of the inspection system. Note that a vacuum system (not shown) is required when the imaging assembly uses electron or charged particle beams.

Figures 1B, 1C:
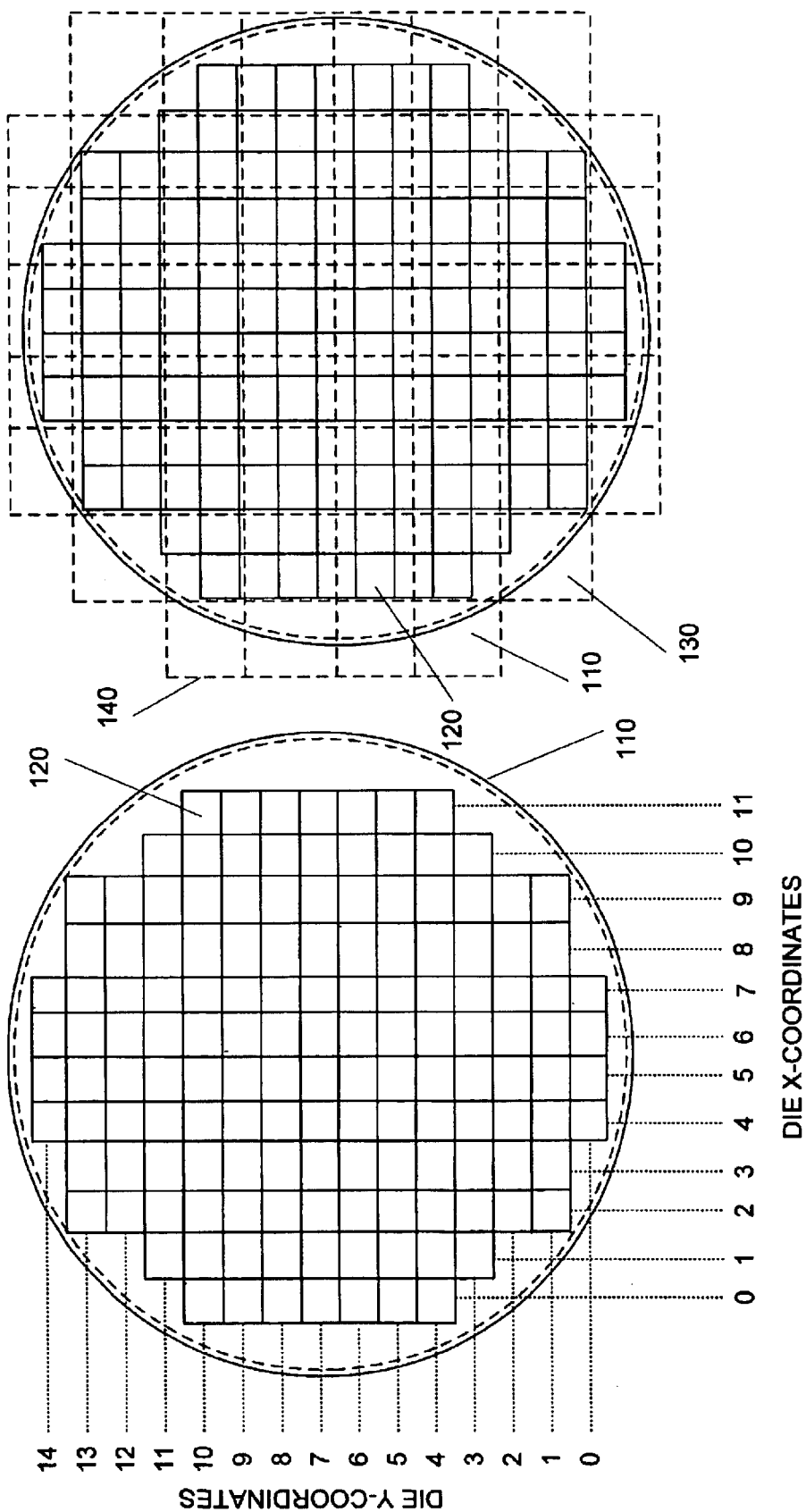
FIG. 1B shows an example of die layout on a semiconductor wafer.
FIG. 1C shows an example of the overlay of imaging modules on the die of a semiconductor wafer.

FIGS. 1B & 1C show an example of the configuration of an imaging assembly for a 300 mm semiconductor wafer and the alignment desired between the imaging assembly and the wafer. FIG. 1B shows a semiconductor wafer 110 covered with identical die 120; in this example the die size is 18 mm×22 mm on a 300 mm wafer with a 3 mm edge exclusion zone. FIG. 1C shows the same semiconductor wafer 110, covered with identical die 120, with an overlay of module footprints 130; the array of modules makes up an imaging assembly, as discussed above, each module comprises a probe forming system and a detector. A row of modules 140 is shown; in this case the row consists of 8 modules.

The alignment of the die 120 on wafer 110 to the array of imaging modules (with footprints 130) is critical to the function of the wafer inspection system. As will be discussed in more detail below, it is necessary to be able to compare blocks of image data (pattern blocks) from equivalent areas of different die on the wafer; it is desired to have the data collected by the imaging modules so that individual pattern blocks are collected by one imaging module, and preferably that pattern blocks being compared from neighboring die are also collected by the same imaging module (this will reduce the difficulty of normalizing data to the point where useful pattern block comparisons can be done without generating false defects). Clearly, a parallel alignment between the array of die and the array of imaging modules is desired; furthermore, the scan direction of the imaging probes and the direction of stage movement should be aligned with these arrays.

A brief overview of the process of defect detection, as envisaged by this invention, for a semiconductor wafer, particularly a wafer covered with identical die, is presented here. An imaging system is used to generate image data, which is acquired in the memory of an image processing system. In the case of a multi-beam imaging system, the data is most efficiently transferred to the image processing system in a number of parallel data streams (typically one data stream for every imaging beam). The incoming data stream is analyzed in real time to determine the necessary brightness and contrast normalization for the image data. Blocks of normalized data (known as pattern blocks) from equivalent areas of two die (typically neighboring die) are cross-correlated in order to enable proper alignment of the patterns in the two blocks; the two blocks are then compared in order to detect defects. Note that when pattern blocks from two die do not match, they are compared with a third die, in order to identify the specific pattern blocks and die with defects. The cross-correlation and comparison is carried out by a large number of independent image processors operating in parallel, allowing defect detection to keep up with the rate of raw image data acquisition. The memory is divided into three independently and simultaneously addressable memory blocks, so as to allow simultaneous data acquisition, data normalization, and cross-correlation and defect detection.

Figure 2:
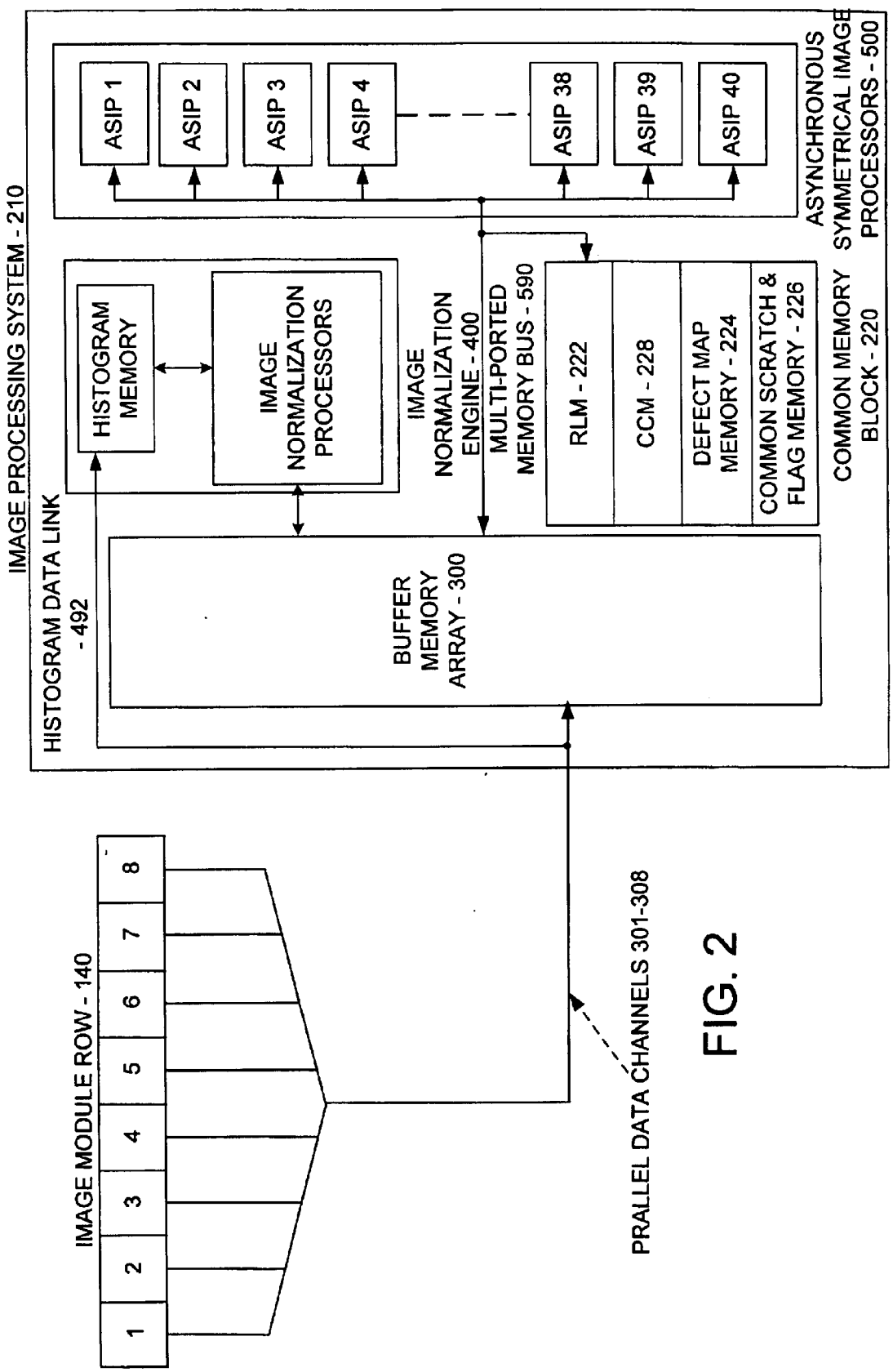
FIG. 2 is a block diagram of an image processing system.

FIG. 2 is a block diagram of an image processing system, shown connected to an example of an imaging module row. In FIG. 2, imaging module row 140, image processing system 210, parallel data channels 301–308, buffer memory array 300, histogram data link 492, image normalization engine 400, common memory block 220, Re-inspection Location Memory (RLM) 222, defect map memory 224, common scratch and flag memory 226, Cross-Correlation Memory (CCM) 228, Asynchronous Symmetrical Image Processors (ASIPs) 500, and multi-ported memory bus 590 are shown.

An image processing computer 200 comprises a multiplicity of image processing systems 210. The number of image processing systems 210 required in an image processing computer 200 is determined by the number of imaging modules, the raw image data rate and the processing speed and data capacity of the image processing systems 210—this question is discussed in more detail below, from the perspective of the performance of the components of an image processing system 210.

Now more detailed consideration is given to the components of image processing system 210.

Figure 3A:
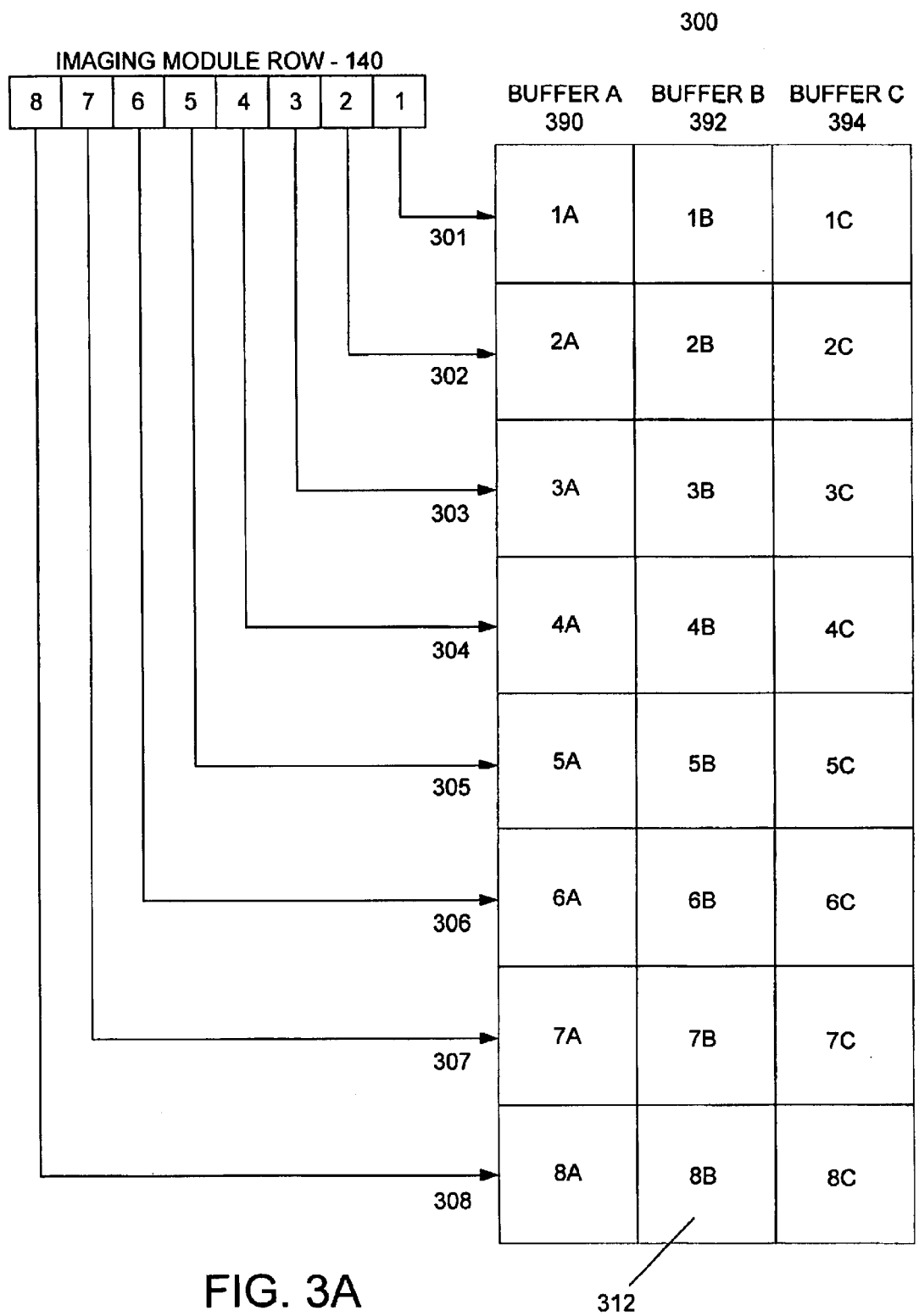
FIG. 3A is a block diagram of a buffer memory array.
Figure 3B:
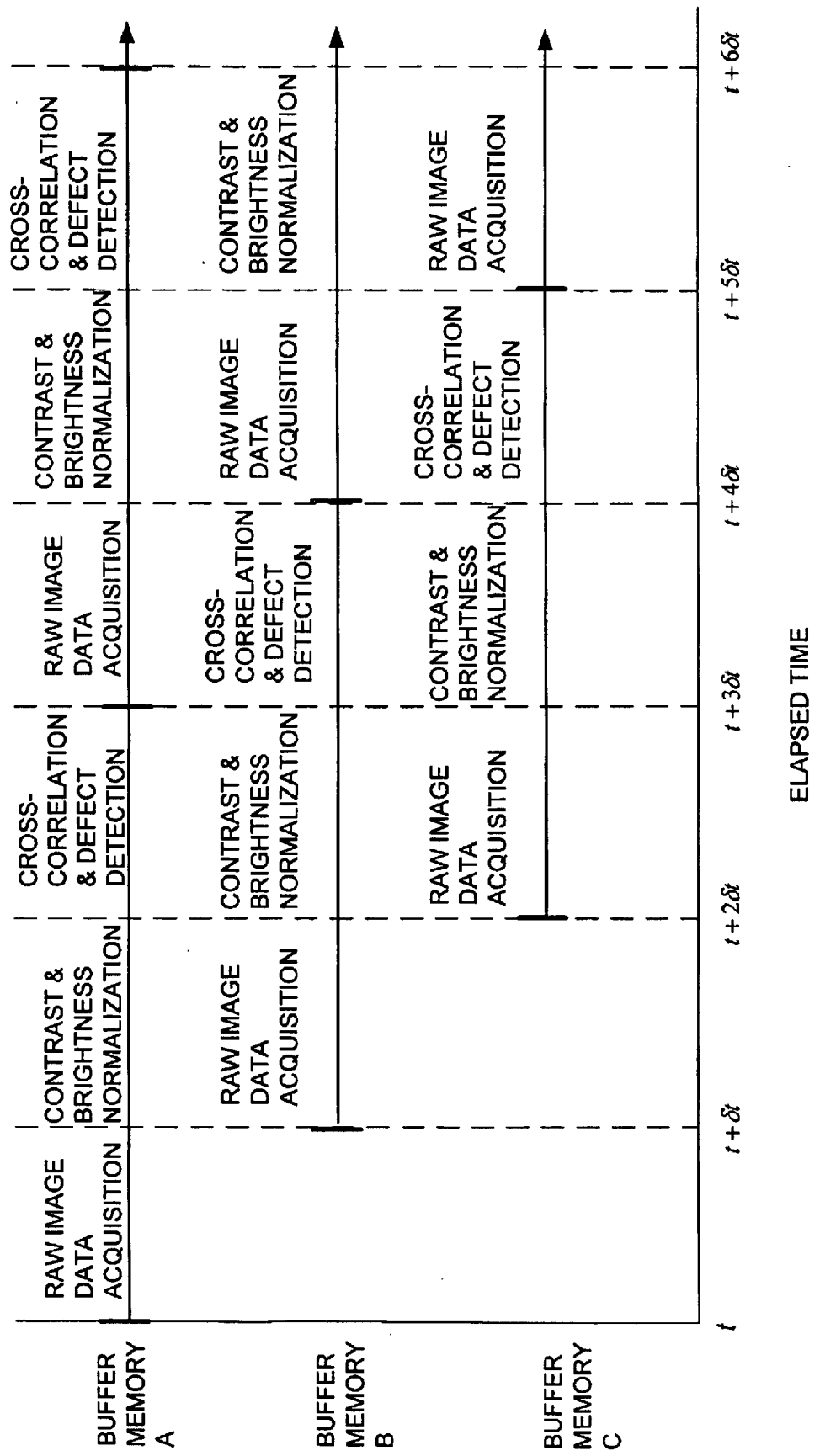
FIG. 3B is a timeline diagram for buffer memory utilization.

FIG. 3A is a block diagram of a buffer memory array, shown connected to an example of an imaging module row. In FIG. 3A, image module row 140, parallel data channels 301–308, buffer memory array 300, buffer memory locations 312, buffer memory A 390, buffer memory B 392, and buffer memory C 394. The buffer memory array 300 is organized into three buffers 390, 392, and 394; consequently, the associated image module row 140 is always filling one buffer with raw image data (390, for example) while the image normalization engine 400 is normalizing the contrast and brightness of data in a second buffer (392, for example) and the ASIPs 500 are performing cross-correlation and defect detection on normalized image data acquired from a third buffer (394, for example). FIG. 3B illustrates in more detail the way in which the three buffer memories—A, B and C—are utilized in a preferred embodiment; this memory configuration allows image data processing to keep-up with raw image data acquisition, while being efficient in the use of computer hardware. As discussed previously, in order for this memory configuration and utilization to work, the three buffer memories must be independently and simultaneously addressable. FIG. 3B shows how the three activities: data acquisition; data normalization; and cross correlation & defect detection utilize the buffer memory array continuously, although the buffer memory accessed (A, B or C) changes in a cyclic mode at constant time intervals (the time intervals being roughly determined by the raw image data acquisition rate and the memory capacity). Following a timeline for one buffer memory in FIG. 3B shows how raw image data is acquired, this image data is then normalized, this normalized data is accessed for cross-correlation and defect detection, new raw image data is acquired, etc. continuing in a cyclic mode until all the image data for a wafer has been acquired and processed.

In the example shown in FIG. 3A, the buffer memory array 300 is organized such that there is one group of three buffer memory locations 312 (one from each buffer 390, 392, and 394) associated with each module in the image module row 140. The data from the first module in image module row 140 is transmitted along parallel data channel 301 to fill buffer memory location 1A, while the data from the second module in image module row 140 is transmitted along parallel data channel 302 to fill buffer memory location 2A, etc. Sufficient buffer memory locations 312 are provided in each buffer 390, 392 and 394 to match the number of imaging modules, as required for each particular system.

A preferred embodiment of the buffer memory array 300 is a single high-speed memory array. Alternative embodiments could have each buffer memory 390, 392, and 394 as separate memories, or memory blocks. Considerations for memory address timing and the latency caused by simultaneous access to the memory locations will be a major determining factor in the implementation chosen.

Figure 4:
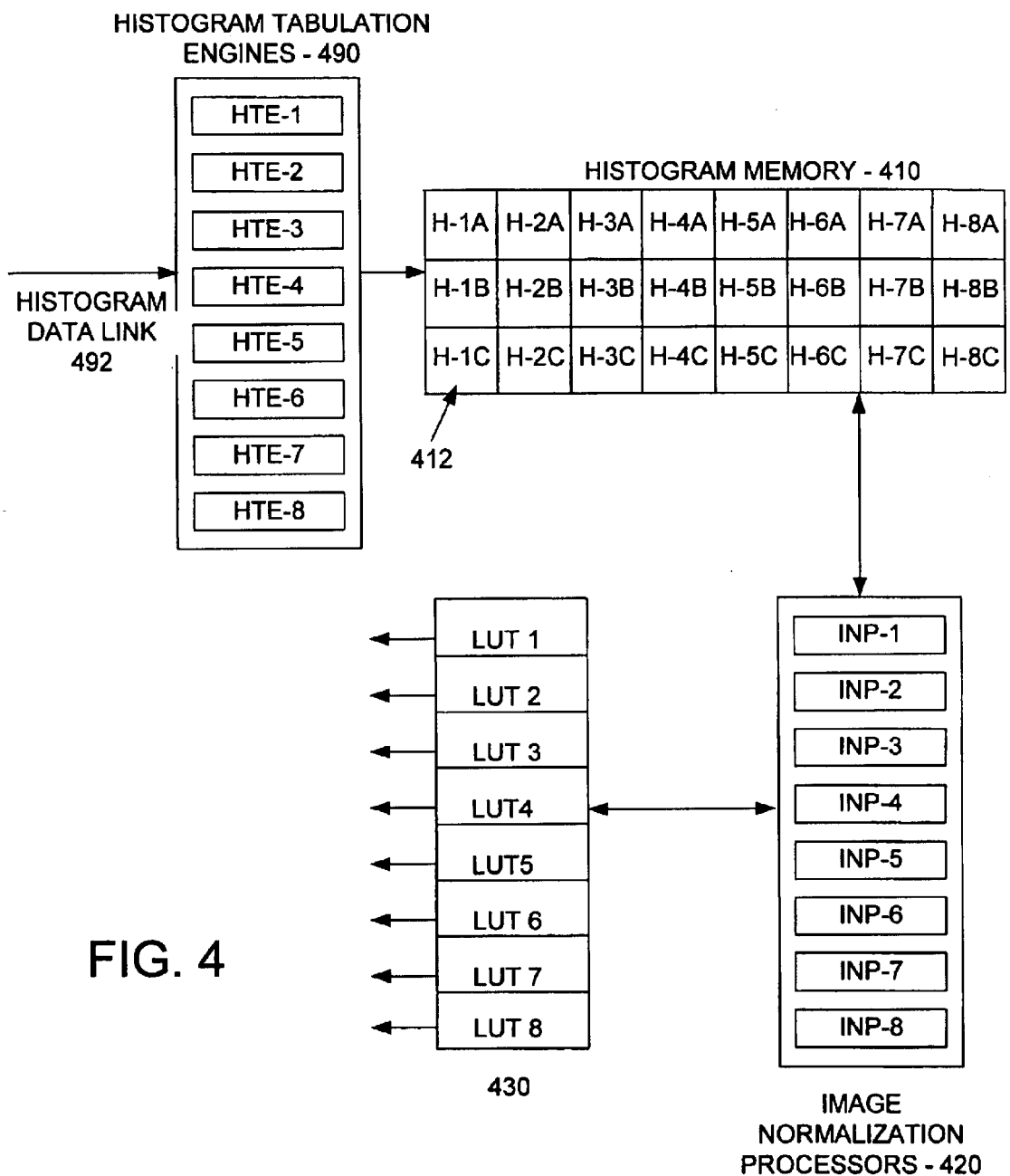
FIG. 4 is a block diagram of an image normalization engine.

FIG. 4 is a block diagram of the image normalization engine. In FIG. 4, histogram memory 410, histogram memory locations 412, image normalization processors (INPs) 420, Look-Up Tables (LUTs) 430, histogram tabulation engines (HTEs) 490, and histogram data link 492 are shown. The image normalization engine 400 structure is closely associated with the number of imaging modules connected to the image processing system 210. The image normalization engine 400 consists of one image normalization processor (INP) 420, one Look-up-Table (LUT) 430, and one histogram tabulation engine 490 for each imaging module connected to the image processing system 210, and one histogram memory location 412 for each buffer memory location 312. While the image data is being acquired, the histogram tabulation engines 490 are generating a histogram for the image data from each imaging module. Once all image data has been acquired and all buffer memory locations 312 for a single buffer 390, 392, or 394 have been filled, the associated histogram memory locations 412 have also been filled. As an example, once the image module row 140 has completed filling buffer A 390, the histogram tabulation engines 490 will also have filled histogram memory locations H-1A through H-8A; any one of the INPs, for example INP-1, will scan these eight histogram memory locations H-1A–H-8A to generate an "ideal histogram" to use as a reference; each INP will then use the ideal histogram on the contents of the related histogram memory location to generate the data necessary to fill the LUTs 430. When the LUTs 430 are applied to the appropriate buffer memory locations 312 (in this example, locations 1A–8A), this will adjust the contrast and brightness of the image data.

A preferred implementation of the image normalization engine 400 uses general purpose microprocessors, of the type that have been enhanced for graphics array processing, for the image normalization processors 420 with local caches for the LUTs 430. In this implementation, the histogram memory 410 is a simple multi-ported memory. The histogram tabulation engines 490 are a DSP or custom programmed FPGA with its own cache memory for tabulations, address calculations, and stack management.

There are many embodiments of the image normalization engine 400. One variation of the preferred embodiment has the histogram tabulation engines 490 maintaining an "ideal histogram" library, and performing the calculations and evaluation to either generate or select this "ideal histogram".

In another embodiment, the image normalization processors 420 are DSPs or FPGAs and a separate block of multi-ported memory is associated with each DSP, effectively tying a histogram memory location 412, associated with a single imaging module, to a single image normalization processor 420.

Figure 5:
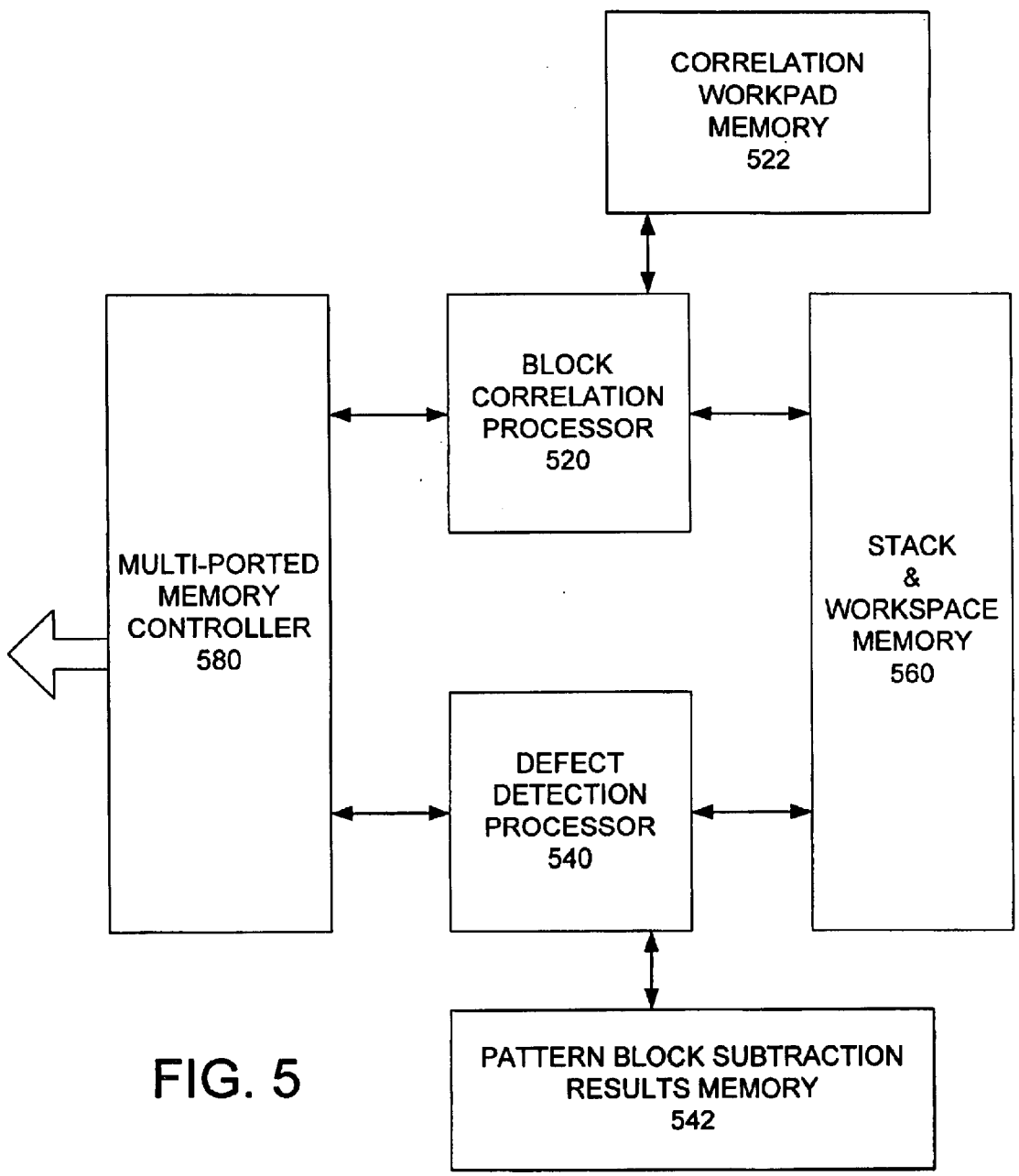
FIG. 5 is a block diagram of an asynchronous symmetrical image processor.

FIG. 5 is a block diagram of an ASIP 500. In FIG. 5, block correlation processor 520, correlation workpad memory 522, defect detection processor 540, pattern block subtraction results memory 542, stack and workspace memory 560, and multiported memory controller 580 are shown.

All image correlation and defect detection is performed by a large group of ASIPs 500 with the following properties: ASIPs 500 operate on exactly two blocks of image data at a time—these pattern blocks are always taken from equivalent areas of different die. ASIPs 500 operate asynchronously from each other—i.e., each ASIP 500 begins processing a new pair of pattern blocks immediately after completing processing of its previous pair, as long as there is still unprocessed data remaining. ASIPs 500 are symmetrical to each other—i.e., they are identical to each other with the exception of their rank. Each ASIP 500 is ranked by its ASIP number—the lower the number, the higher the rank. Ranking is used to break ties—if two ASIPs 500 complete processing at the same time, the higher ranking one will have first access to the next pair of data blocks to be processed. Each ASIP 500 is a self-contained image processor with its own image cross-correlation and defect detection capability.

The number of ASIPs 500 can be chosen to ensure that the defect detection process is faster than the image acquisition process. In the example shown in FIG. 2, the number of ASIPs 500 in an image processing system 210 varies with the total data acquisition rate for an image module row 140. This means that the number of ASIPs 500 will vary with the number of modules in an image module row 140, but, unlike other structures in an image processing system 210 (such as the number of image normalization processors 420), the number of ASIPs 500 will also vary with the data rate from the modules in the image module row 140. If, for example, all else were kept equal, but the scan rate (pixel acquisition clock rate) of a single module were doubled from 118 Mpixels/sec to 236 Mpixels/sec, the number of ASIPs 500 would double.

The RLM 222 records which data blocks have already been inspected for defects, and whether any potential defects were found; when a potential defect is identified in a particular pair of pattern blocks, each of the data blocks will then be compared with other data blocks in order to confirm the location of the defect. Cross-correlation measures any offset between the patterns in the two data blocks being compared (nominally from equivalent areas of different die) and then uses this measurement to displace one data block relative to the other in order to facilitate defect detection; the CCM 228 stores the offset data for all of the data blocks.

Each ASIP 500 will consist of two processing capabilities. First, the block correlation processor 520 will read the appropriate pattern block from each of the two die being compared. This data will come from one or more of the buffer memory locations 312 in the appropriate memory buffer 390, 392, or 394; the data is transmitted across the multi-ported memory bus 590, as controlled by the multi-ported memory controller 580 and into the common stack and workspace memory 560. The cross-correlation will begin with a pre-offset by the amount stored in the CCM 228; each cross-correlation result will be stored in the correlation workpad memory 522. Once the block correlation processor 520 has determined the appropriate offset, the overlay of the image data is adjusted. The block correlation processor 520 ensures that a copy of the adjusted image data is in the stack & workspace memory 560; it then begins to read-in new image data. Second, the defect detection processor 540 subtracts the adjusted image data from the two die, one from the other; the results are stored in the pattern block subtraction results memory 542. The defect detection processor 540 then updates the RLM 222 to reflect both the fact of the defect detection action and whether any of the resultant differences meet the user's criteria for reportable defects. If a defect is identified and the detection algorithm is able to identify which die contains the defect, a defect map is generated from the contents of the pattern block subtraction results memory 542 and stored in the defect map memory 224. The RLM 222, CCM 228 and defect map memory 224 are in the common memory block 220, where all ASIPs 500 can access the information.

The cross-correlation calculations are iterative in nature and the time required to complete the calculation is strongly dependent on how close the starting point for the iteration is to the actual offset that exists between the two pattern blocks; it is generally more efficient to start with an assumed offset, which is that for a neighboring pattern block, should the data be available. Consequently, a preferred method for the ASIPs 500 to process data includes choosing the sequence in which pattern blocks undergo cross-correlation so as to ensure that, for a majority of cross-correlation calculations, offset data will be accessible in the CCM 228 for a neighboring pattern block.

A preferred embodiment of the ASIP 500 uses one high speed microprocessor that has been designed for symmetrical multiprocessing, providing both the block correlation processor 520 and the defect detection processor 540 functions. Depending on the processor chosen, the correlation workpad memory 522, the PB subtraction results memory 542 and the stack & workspace memory 560 may all be co-resident in the microprocessor's L2 cache.

An alternative embodiment could use a high speed DSP, intelligent FPGA or similar device for the block correlation processor 520 and a separate, slightly slower speed DSP, intelligent FPGA, or similar device for the defect detection processor 540. In this implementation, these processors will probably be co-resident on a daughter board, along with the multi-ported memory controller 580, the correlation workpad memory 522, the PB subtraction results memory 542 and the stack & workspace memory 560.

While the invention has been described with reference to particular embodiments, this description is solely for the purpose of illustration and is not to be construed as limiting the scope of the invention claimed below. For example, a post processor, as discussed in U.S. application Ser. No. 09/789,180 and PCT Application No. PCT/US01/05338, can be connected to the output of the image processing system allowing the mapped defects to be classified by type. This defect classification can be performed manually by an operator or in an automatic mode by using a defect analysis computer.

It will be apparent to those skilled in the art that certain embodiments of the image processing system and inspection system can be used to inspect semiconductor masks.

What is claimed is:

1. An image processing system for semiconductor wafer inspection comprising:

a buffer memory array, for storing raw image data acquired from a wafer; and a multiplicity of identical image processors connected to said buffer memory array, said image processors and said buffer memory array being configured so that said image processors (a) all operate independently in parallel on different pairs of image data blocks and (b) individually process in serial different pairs of image data blocks, one pair immediately after another, irrespective of the processing status of any other of said image processors:

wherein said pairs of image data blocks are from equivalent areas of different die on said wafer and said image processors are configured to perform image cross-correlation and defect detection.

2. An image processing system as in claim 1 further comprising an image normalization engine connected at its output to said buffer memory array, for normalizing image contrast and brightness so as to facilitate die to die image comparison as performed by said image processors.

3. An image processing system as in claim 1, wherein said buffer memory array is divided into three independently and simultaneously addressable memory blocks.

4. An image processing system as in claim 1, further comprising a multiplicity of parallel data channels connected to said buffer memory array, for delivering raw image data to said buffer memory array.

5. An image processing system as in claim 2, further comprising a histogram data link connected to said image normalization engine, for delivering raw image data to said image normalization engine.

6. An image processing system as in claim 5, wherein said image normalization engine comprises histogram tabulation engines connected to said histogram data link, for real-time generation of histograms of raw image data.

7. An image processing system as in claim 1, further comprising a defect map memory connected to said image processors, for storing a map of defects as identified by an algorithm programmed into said image processors.

8. An image processing system as in claim 1, further comprising a cross-correlation memory connected to said image processors, for storing pattern block offset data.

9. An inspection system for a semiconductor wafer patterned with an array of identical dies, comprising:

an array of modules, each module comprising a probe forming system and a detector, said array comprising a multiplicity of module rows, the array of die on the wafer being aligned with said module rows;

an image processing computer comprising a multiplicity of image processing systems, each image processing system comprising a multiplicity of identical image processors connected to a buffer memory array, said image processors and said buffer memory array being configured so that said image processors (a) all operate independently in parallel on different pairs of image data blocks and (b) individually process in serial different pairs of image data blocks, one immediately after another, irrespective of the processing status of any other of said image processors; and a multiplicity of parallel data channels connecting said detectors to said image processing computer;

wherein said pairs of image data blocks are from equivalent areas of different die on the wafer and said image processors are configured to perform image cross-correlation and defect detection.

10. An inspection system as in claim 9, wherein said probe forming system is a charged particle probe forming system.

11. An inspection system as in claim 10, wherein said charged particle probe forming system is an electron probe forming system.

12. An inspection system as in claim 10, wherein said detector is a secondary electron detector.

13. An inspection system as in claim 9, wherein there is one of said multiplicity of image processing systems dedicated to each of said module rows.

14. An inspection system as in claim 9, image processed further comprising a cross-correlation memory connected to said image processors, for storing pattern block offset data.

15. An inspection system as in claim 9, wherein each of said image processing systems further comprises an image normalization engine connected at its output to said buffer memory array, for normalizing image contrast and brightness so as to facilitate die-to-die image comparison as performed by said image processors.

16. An inspection system as in claim 9, wherein said buffer memory array is divided into three independently and simultaneously addressable memory blocks.

17. An inspection system as in claim 15, further comprising a histogram data link connected to said image normalization engine, for delivering raw image data to said image normalization engine.

18. An inspection system as in claim 17, wherein said image normalization engine comprises histogram tabulation engines connected to said histogram data link, for real-time generation of histograms of raw image data.

19. An inspection system as in claim 9, further comprising an inspection image display module connected to said of image processing computer.

20. A method for semiconductor wafer defect detection comprising the steps of:

acquiring raw image data from the wafer;

to simultaneously with said acquiring step, normalizing image data for contrast and brightness; and simultaneously with said acquiring and normalizing steps, performing cross-correlation and defect detection on normalized image data;

wherein said performing step is implemented by a multiplicity of identical image processors, said image processors operating (a) independently on different pairs of image data blocks in parallel and (b) individually on different pairs of image data blocks in serial, one pair immediately after another, irrespective of the processing status of any other of said image processors, said pairs of image data blocks being from equivalent areas of different die on the wafer.

21. A method for defect detection as in claim 20, wherein said image processors are ranked, for determining priority in accessing image data blocks.

22. A method for defect detection as in claim 20, wherein said acquiring, normalizing and performing steps all access a common buffer memory array.

23. A method for defect detection as in claim 22, wherein said buffer memory array is divided into three independently and simultaneously addressable memory blocks.

24. A method for defect detection as in claim 20, wherein said image processors utilize a pattern block inspection sequence designed to minimize the time required to complete cross-correlation.

25. A method for defect detection as in claim 20, further comprising the step of taking data from a cross-correlation memory, simultaneous to said performing step, for establishing an efficient starting point for cross-correlation.

26. A method for semiconductor wafer defect detection, comprising the steps of:

(a) acquiring raw image data from the wafer into a first buffer memory block;

(b) next, acquiring raw image data from the wafer into a second buffer memory block, and simultaneously normalizing data in said first buffer memory block;

(c) next, acquiring raw data from the wafer into a third buffer memory block, simultaneously normalizing data in said second buffer memory block, and simultaneously performing cross-correlation and defect detection on image data accessed from said first buffer memory block;

(d) next, acquiring raw data from the wafer into a first buffer memory block, simultaneously normalizing data in said third buffer memory block, and simultaneously performing cross-correlation and defect detection on image data accessed from said second buffer memory block;

(e) next, acquiring raw data from the wafer into a second buffer memory block, simultaneously normalizing data in said first buffer memory block, and simultaneously performing cross-correlation and defect detection on image data accessed from said third buffer memory block; and (f) next, repeating steps (c) through (e) until all raw image data is acquired and processed.

27. An inspection system for a substrate patterned with an array of identical dies, comprising:

a row of modules, each module comprising a probe forming system and a detector, the array of die on the substrate being aligned with said module row;

an image processing system comprising a multiplicity of identical image processors connected to a buffer memory array, said image processors and said buffer memory array being configured so that said image processors (a) all operate independently in parallel on different pairs of image data blocks and (b) individually process in serial different pairs of image data blocks, one immediately after another, irrespective of the processing status of any other of said image processors; and a multiplicity of parallel data channels connecting said detectors to said processing system;

wherein said pairs of image data blocks are from equivalent areas of different die on the substrate and said image processors are configured to perform image cross-correlation and defect detection.

28. An inspection system as in claim 27, wherein said probe forming system is a charged particle probe forming system.

29. An inspection system as in claim 28, wherein said charged particle probe forming system is an electron probe forming system.

30. An inspection system as in claim 27, wherein said detector is a secondary electron detector.

* * * * *

UNITED STATES PATENT AND TRADEMARK OFFICE
CERTIFICATE OF CORRECTION

PATENT NO.    : 6,738,506 B2
DATED         : May 18, 2004
INVENTOR(S)   : S. Daniel Miller, William Parker and Steven B. Hobmann It is certified that error appears in the above-identified patent and that said Letters Patent is hereby corrected as shown below:

Column 9,
Lines 19-21, reading:
"14. An inspection system as in claim 9, image processed further comprising a cross-correlation memory connected to said image processors, for storing pattern block offset data." should read:
-- 14. An inspection system as in claim 9, futher comprising a cross-correlation memory connected to said image processors, for storing pattern block offset data. --
Lines 39-41, reading:
"19. An inspection system in claim 9, further comprising an inspection image display module connected to said of image processing computer." should read:
-- 19. An inspection system in claim 9, further comprising an inspection image display module connected to said image processing computer. --
Lines 42-45, reading:
"20. A method for semiconductor wafer defect detection comprising the steps of:
    acquiring raw image data from the wafer;
    to simultaneously with said acquiring step, normalizing" should read:
20. A method for semiconductor wafer defect detection comprising the steps of:
    acquiring raw image data from the wafer;
    simultaneously with said acquiring step, normalizing --

Signed and Sealed this

Twelfth Day of October, 2004

JON W. DUDAS
*Director of the United States Patent and Trademark Office*